United States Patent
Gil et al.

(10) Patent No.: US 10,305,563 B2
(45) Date of Patent: May 28, 2019

(54) MASSIVE ANTENNA-BASED PATTERN/POLARIZATION BEAM DIVISION, MULTIPLE ACCESS METHOD, AND APPARATUS PERFORMING THE SAME

(71) Applicant: KOREA ADVANCED INSTITUTE OF SCIENCE AND TECHNOLOGY, Daejeon (KR)

(72) Inventors: Gye Tae Gil, Daejeon (KR); Dong Ho Cho, Daejeon (KR); Ju Yong Lee, Daejeon (KR); Dae Hee Park, Daejeon (KR); Yong Hoon Lee, Daejeon (KR); Sang Min Oh, Daejeon (KR); Seung Won Keum, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/742,171

(22) PCT Filed: May 24, 2016

(86) PCT No.: PCT/KR2016/005459
§ 371 (c)(1),
(2) Date: Jan. 5, 2018

(87) PCT Pub. No.: WO2017/061681
PCT Pub. Date: Apr. 13, 2017

(65) Prior Publication Data
US 2018/0205436 A1  Jul. 19, 2018

(30) Foreign Application Priority Data

Oct. 6, 2015 (KR) .................. 10-2015-0140412
Mar. 21, 2016 (KR) .................. 10-2016-0033376

(51) Int. Cl.
 H04B 7/06 (2006.01)
 H04B 7/0408 (2017.01)
 H04B 7/0452 (2017.01)

(52) U.S. Cl.
 CPC ......... H04B 7/0617 (2013.01); H04B 7/0408 (2013.01); H04B 7/0452 (2013.01)

(58) Field of Classification Search
 None
 See application file for complete search history.

(56) References Cited

U.S. PATENT DOCUMENTS

2010/0165914 A1  7/2010  Cho et al.
2013/0273858 A1  10/2013  Sover et al.
(Continued)

FOREIGN PATENT DOCUMENTS

KR  1020140092951 A  7/2014
KR     101554839 A  9/2015

OTHER PUBLICATIONS

Beam Division Multiple Access Transmission for Massive MIMO Communications; IEEE Trans Communication, vol. 63, No. 6, Jun. 2015 (Year: 2015).*

Primary Examiner — Kodzovi Acolatse
(74) Attorney, Agent, or Firm — Yakov S. Sidorin; Quarles & Brady LLP

(57) ABSTRACT

A massive antenna-based pattern/polarization beam division multiple access method and an apparatus performing the same are provided. The massive antenna-based pattern/polarization beam division multiple access method includes generating a plurality of beam sectors for each antenna array by using a plurality of pattern/polarization antenna arrays and performing MIMO transmission in each of the plurality of beam sectors, wherein the plurality of pattern/polarization antenna arrays each have a different radiation pattern.

10 Claims, 14 Drawing Sheets

(56) References Cited

U.S. PATENT DOCUMENTS

| | | | |
|---|---|---|---|
| 2014/0050280 A1* | 2/2014 | Stirling-Gallacher | ........................ H04B 7/0486 375/296 |
| 2014/0369328 A1* | 12/2014 | Park | ...................... H04L 5/0037 370/337 |
| 2015/0280796 A1* | 10/2015 | Yen | ...................... H04B 7/0421 370/294 |
| 2015/0289147 A1* | 10/2015 | Lou | ...................... H04B 7/0408 370/329 |
| 2016/0119910 A1* | 4/2016 | Krzymien | ............ H04B 7/0639 370/329 |
| 2016/0156397 A1* | 6/2016 | Onggosanusi | ....... H04B 7/0456 370/252 |
| 2017/0214442 A1* | 7/2017 | Chae | .................... H04B 7/0456 |

* cited by examiner

○ : ANTENNA ELEMENT OF TYPE 1 PATTERN/POLARIZATION ANTENNA ARRAY
△ : ANTENNA ELEMENT OF TYPE 2 PATTERN/POLARIZATION ANTENNA ARRAY
□ : ANTENNA ELEMENT OF TYPE 3 PATTERN/POLARIZATION ANTENNA ARRAY
◇ : ANTENNA ELEMENT OF TYPE 4 PATTERN/POLARIZATION ANTENNA ARRAY

MASSIVE ANTENNA-BASED PATTERN/POLARIZATION BEAM DIVISION, MULTIPLE ACCESS METHOD, AND APPARATUS PERFORMING THE SAME

CROSS-REFERENCE TO RELATED APPLICATIONS

This application represents the U.S. National stage entry of International Application PCT/KR2016/005459, filed on May 24, 2016, and claims priority to and the benefit of Korean Patent Application No. 10-2015-0140412, filed on Oct. 6, 2015, and Korean Patent Application No. 10-2016-0033376, filed on Mar. 21, 2016. The disclosure of each of the above-identified applications is incorporated herein by reference.

TECHNICAL FIELD

Disclosed are a massive antenna-based pattern/polarization beam division multiple access method and an apparatus performing the same.

BACKGROUND ART

Massive multiple input multiple output (MIMO) is a wireless transmission technology using multiple antennas at a base station or a relay, in which interference between user equipment (UE) signals is spatially controlled through the same beamforming, so that a large number of UE devices are simultaneously serviced by using the same amount of wireless resources, and also the power consumption per UE device is reduced by a reciprocal of the number of antennas.

However, in the case of the massive MIMO, when beamforming is applied to each UE device in a wide service area such as the conventional three sectors, in order to implement the massive MIMO technology by the frequency division duplexing (FDD), the UE device needs to estimate massive MIMO channel state information (CSI) and feed back the estimated Massive MIMO CSI to a base station such that the base station uses the CSI in determining weights. Therefore, such a great amount of CSI feedback makes it difficult to implement the massive MIMO technology.

In order to solve this problem, a method in which a sector of the conventional three-sector system is divided into a plurality of beam sectors and beam division multiple access (BDMA), as a technology for the conventional multiuser (MU)-MIMO, is provided in the beam sector has been proposed. The BDMA technology not only effectively divides frequency/time resources but also spatial resources in a mobile communication system, and allocates orthogonal beams to UE devices, allowing for multiple access. That is, the BDMA technology allows terminals located in similar positions to communicate by sharing a single beam.

Technical Problem

The embodiments improve a difficulty in transmitting N streams in their entirety when a MIMO channel in a beam sector has a large condition number in the conventional BDMA technology.

Also, in the embodiments, B beam sectors are formed for each antenna array by using K antenna arrays so that frequency is reused in a BDMA scheme, and in order to simultaneously implement MIMO transmission in each beam sector, the K antenna arrays are configured to have different radiation patterns (including polarizations) and K signals are allowed to be simultaneously performed MIMO transmission in each beam sector, so that degree of freedom (DoF) and spectral efficiency of a system are improved.

Also, in the embodiments, K antenna arrays each having a different pattern in an overlapping manner are used such that K streams are simultaneously transmitted in a MIMO scheme by using K beams having the same AoD, thus preventing the physical space for the K transmit antenna arrays from being increased and enhancing the spatial efficiency.

Technical Solution

A pattern/polarization beam division multiple access (BDMA) method according to an embodiment includes: generating a plurality of beam sectors for each antenna array by using a plurality of pattern/polarization antenna arrays; and performing MIMO transmission in each of the plurality of beam sectors, wherein the plurality of pattern/polarization antenna arrays each have a different radiation pattern.

The performing of the MIMIO transmission may include: precoding signals that are transmitted to each of the plurality of beam sectors; performing beamforming on the precoded signals on the basis of a weight for each of the precoded signals; and transmitting the beamformed signals by using each of the plurality of pattern/polarization antenna arrays.

The plurality of antenna arrays may be implemented in an overlapping structure.

Angles of departure of beams generated from each of the plurality of beam sectors may be approximately the same regardless of antenna array indexes of the plurality of pattern/polarization antenna arrays.

A communication apparatus according to an embodiment includes: a plurality of pattern/polarization antenna arrays each having a different radiation pattern; and a controller configured to generate a plurality of beam sectors for each antenna array by using the plurality of pattern/polarization antenna arrays and to perform MIMO transmission in each of the plurality of beam sectors.

The controller may include: a precoder configured to precode signals that are transmitted to each of the plurality of beam sectors; and a beamformer configured to perform beamforming on the precoded signals on the basis of a weight for each of the precoded signals.

The plurality of antenna arrays may be implemented in an overlapping structure.

Angles of departure of beams generated from each of the plurality of beam sectors may be approximately the same regardless of antenna array indexes of the plurality of pattern/polarization antenna arrays.

The precoder is implemented for each of the beam sectors.

DETAILED DESCRIPTION

Figure 1:
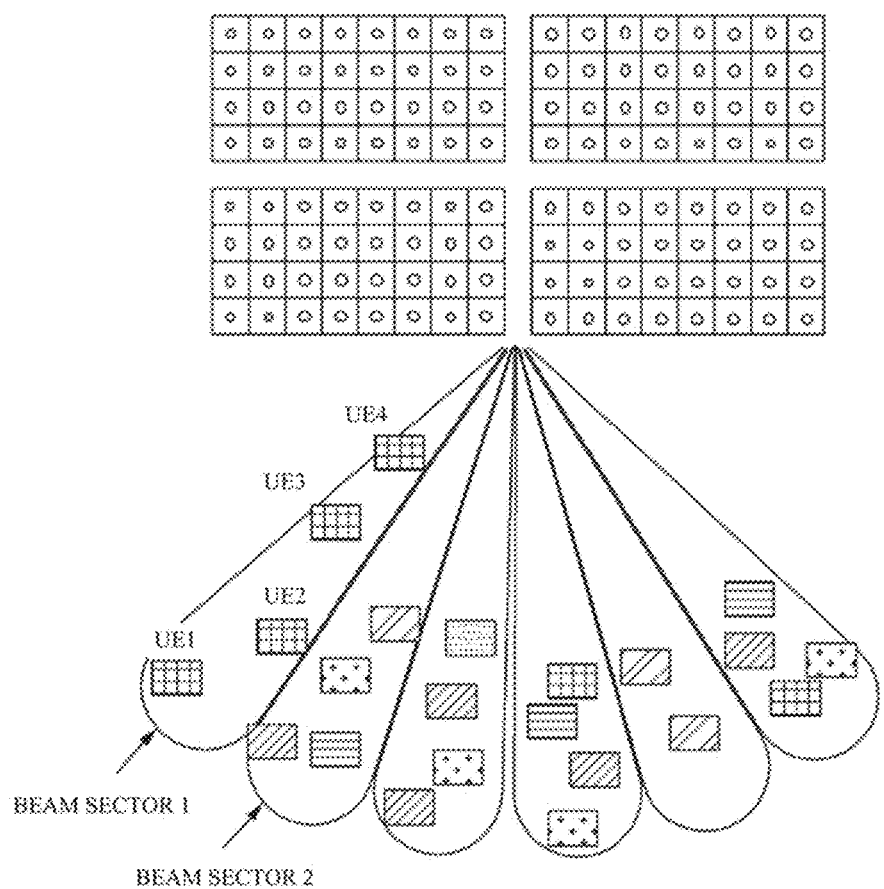
FIG. 1 illustrates an example of a MIMO BDMA system.

It is to be understood that the specific structural or functional descriptions for embodiments of the present invention disclosed herein are presented for purposes of illustrating embodiments of the inventive concept only and are not intended to limit the scope of the inventive concept. The embodiments of the inventive concept may be embodied in various forms and are not limited to the embodiments described herein.

The embodiments according to the concept of the present invention can be variously modified and may have various forms, so that the embodiments are illustrated in the drawings and described in detail herein. It should be understood, however, that there is no intent to limit the present invention to the particular forms disclosed, but on the contrary, the present invention to cover all variations, equivalents, or alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. However, the scope of the patent application is not restricted or limited by these embodiments. The same reference numerals are shown in each drawing represent the same members.

The embodiments described below, as core 5G technologies of 3GPP, relate to an advanced new concept of full dimension MIMO (FD-MIMO) technology that is being standardized. Compared to the conventional BDMA technology, the embodiments provide remarkably enhanced spectral efficiency, and thus a significant impact on the mobile and the wireless communication markets is expected.

FIG. 1 illustrates an example of a MIMO BDMA system.

Referring to FIG. 1, a MIMO BDMA technology forms beam sectors by using a beamformer, and allows each beam sector to provide a single user multiple input multiple output (SU-MIMO) transmission, or a multi user multiple input multiple output (MU-MIMO) transmission.

The MIMO BDMA technology may have the following constraints in:

<Achievement of Degree of Freedom (DoF)>

When K transmit antenna arrays transmit multiple streams while being spaced apart from each other by a predetermined interval or more, and K signals are transmitted to a beam sector in which angles of departure (AoDs) for K signals are the same, a condition number of a MIMO channel between K receive antennas and K transmit antennas becomes large, which leads to difficulty in transmitting K streams in their entirety.

<Spatial Utilization>

Since K antenna arrays need to be disposed at an interval of a half wavelength or above therebetween in order to simultaneously transmit K streams by using K beams having the same AoD in a MIMO scheme, the physical space for K transmit antenna arrays may need to be large.

In order to describe the pattern polarization beam division multiple access (P2BDMA) technology according to embodiments, "a pattern/polarization antenna element" and "a pattern/polarization antenna array" described in the specification are defined as follows.

In the specification, "a pattern/polarization antenna element" represents an antenna element that has a polarization characteristic and thus has a unique radiation pattern, and "a pattern/polarization antenna array" represents an antenna array composed of a plurality of antenna elements having the same polarization characteristic and the same radiation pattern.

To achieve the above-described feature, the P2BDMA technology according to embodiments may operate as follows.

<Achievement of DoF>

B beam sectors are generated for each array by using K antenna arrays so that frequency can be reused in a BDMA scheme.

In order to implement MIMO transmission in each beam sector, the K antenna arrays are configured to have different radiation patterns.

In order for K signals to be transmitted to a beam sector b, the K signals $\{s_1(b), s_2(b), \ldots s_K(b)\}$ to be transmitted to the beam sector b are precoded, and the precoder output signals $\{u_1(b), u_2(b) \ldots u_K(b)\}$ are beamformed by using weight vectors w(b) for the respective signals, and a beamformer output signal $\{x_k(b), k=1, 2, \ldots K\}$ is transmitted by using a respective pattern polarization antenna array k (k=1, 2, ..., and K).

In this case, a precoder b may control interference between the K signals to be transmitted to the beam sector b.

<Spatial Utilization>

The K transmit antenna array may be integrated by overlaying.

Accordingly, the above-described constraints may be improved as follows through the P2BDMA technology:

<Achievement of DoF>

Since K signals are simultaneously transmitted in a MIMO transmission to each beam sector by using K transmission pattern/polarization antenna arrays so that the DoF of the system K, spatial efficiency is ensured.

<Spatial Utilization>

In simultaneously transmitting K streams by using K beams having the same AoD in a MIMO scheme, K antennas each having a different pattern are used in an overlapping manner, so that the physical space for the K transmit antenna arrays is prevented from being increased.

Hereinafter, the P2BDMA technology according to embodiments is described in detail.

Figure 2:
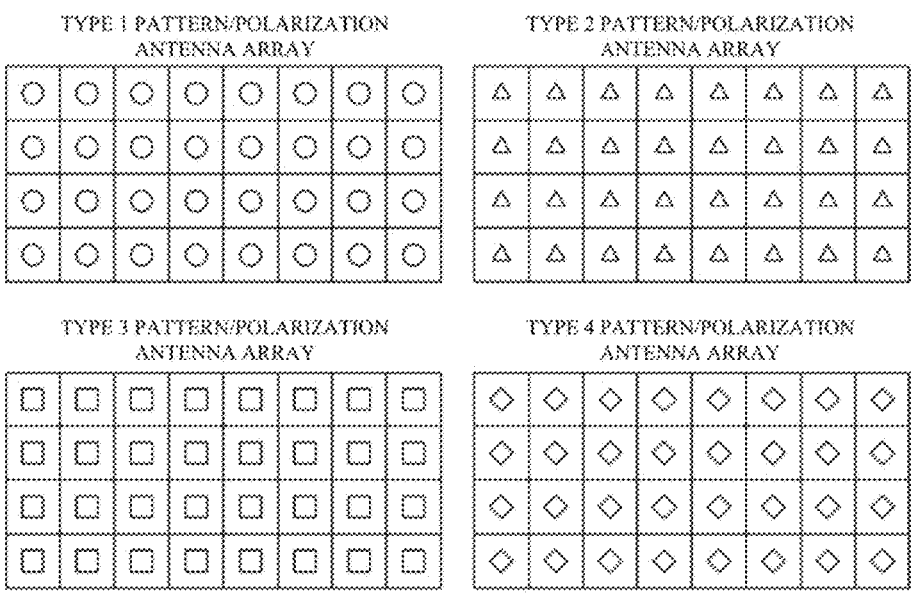
FIG. 2 illustrates pattern polarization antenna arrays according to an embodiment.
Figure 3:
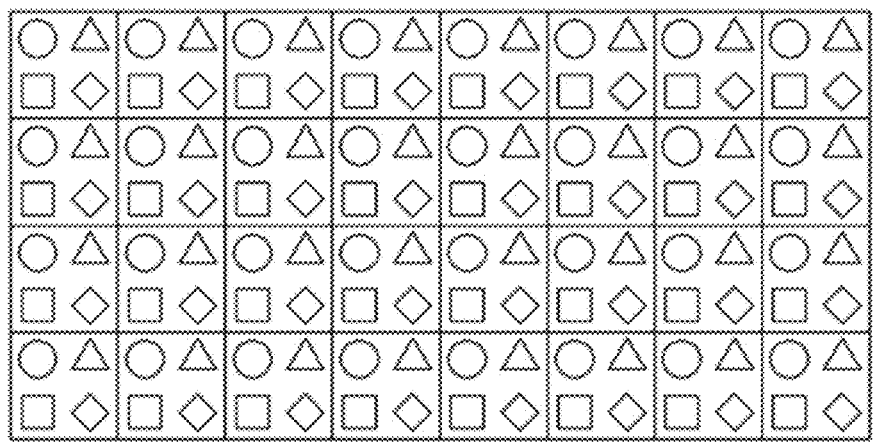
FIG. 3 illustrates an example of an antenna structure using the polarization antenna arrays shown in FIG. 2.

FIG. 2 illustrates pattern/polarization antenna arrays according to an embodiment, and FIG. 3 illustrates an example of an antenna structure using the pattern/polarization antenna arrays shown in FIG. 2.

Referring to FIG. 2, the P2BDMA technology may use a plurality of antenna arrays each having an independent pattern/polarization characteristic. In FIG. 2, for convenience of description, it is assumed that the antenna arrays are provided as four antenna arrays each having an independent pattern/polarization characteristic.

As illustrated in FIG. 2, a first pattern/polarization antenna array (Type 1) may include first pattern/polarization antennas each having a first polarization characteristic and a first radiation characteristic. A second polarization antenna array (Type 2) may include second pattern/polarization antennas each having a second polarization characteristic and a second radiation characteristic. A third polarization antenna array (Type 3) may include third pattern/polarization antennas each having a third polarization characteristic and a third radiation characteristic. A fourth polarization antenna array (Type 4) may include fourth pattern/polarization antennas each having a fourth polarization characteristic and a fourth radiation characteristic.

The first polarization characteristic, the second polarization characteristic, the third polarization characteristic, and the fourth polarization characteristic may be different from each other. Also, the first radiation pattern characteristic, the second radiation pattern characteristic, the third radiation pattern characteristic, and the fourth radiation pattern characteristic may be different from each other.

A result of analyzing the performance of the antenna arrays Type 1 to Type 4 having four independent pattern/polarization characteristics are described below.

As shown in FIG. 3, the antenna arrays Type 1 to Type 4 having four independent pattern/polarization characteristics may be implemented in an overlapping structure. Accordingly, the physical space for the antennas may be saved.

Figure 4:
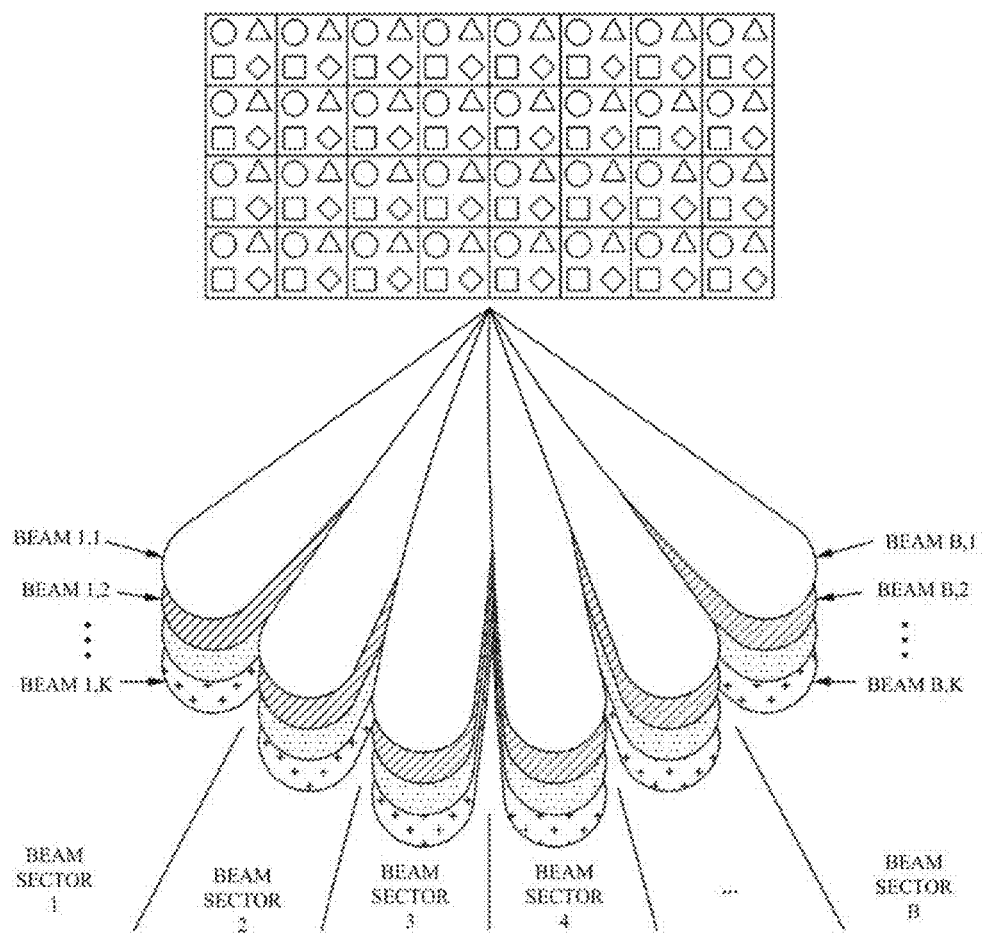
FIG. 4 illustrates a conceptual diagram of beam sectorization in pattern polarization BDMA technology according to an embodiment.

FIG. 4 illustrates a conceptual diagram of beam sectorization by BDMA technology according to an embodiment.

Referring to FIG. 4, a plurality of beam sectors are formed by using the pattern/polarization arrays shown in FIG. 3, and a method of generating a beam in each of the beam sectors is as follows.

K pattern/polarization antenna arrays having different radiation patterns are used.

Each of the pattern/polarization antenna arrays may generate (form) B beam sectors through beamforming. In other words, B beam sectors may be generated for each pattern/polarization antenna. A beam generated in a $b^{th}$ beam sector by a $k^{th}$ pattern/polarization antenna array, for example, a beam 1, k may have approximately the same AoD regardless of an array index k. That is, $\Omega(b, k) \approx \Omega(b)$ for all $k \in [1,K]$. Herein, $\Omega(b)$ may represent an AoD of the $b^{th}$ beam sector.

In this manner, a K×K MIMO channel may be formed in the particular beam sector b.

Figure 5:
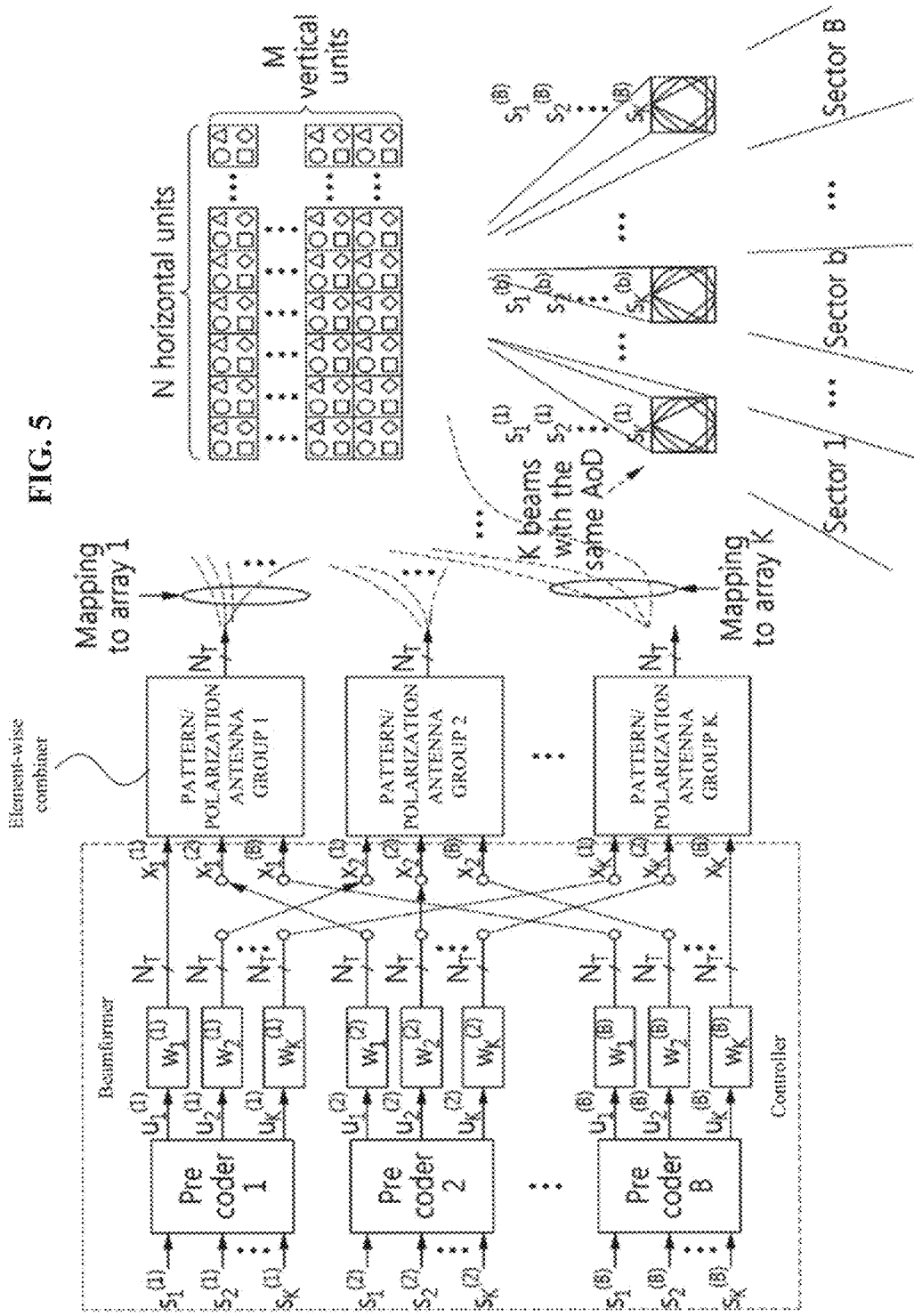
FIG. 5 illustrates a P2BDMA transmitter structure according to an embodiment.

FIG. 5 illustrates a structure of a transmitting apparatus that performs P2BDMA according to an embodiment. Referring to FIG. 5, a method of transmitting K streams in each of the B beam sectors by using the structure of the transmitting apparatus is described. For example, the transmitting apparatus may be a fixed base station or a mobile base station that communicates with user equipment (UE). Also, the transmitting apparatus may be referred to as a node-B, an eNode-B (or eNB), a base transceiver system (BTS), or an access point (AP).

UE within each beam sector may receive K streams. UE may be referred to as a mobile station (MS), a mobile terminal (MT), a terminal or a user terminal (UT), a wireless terminal, an access terminal (AT), a subscriber unit, a subscriber station (SS), a wireless device, a wireless communication device, a wireless transmit/receive unit (WTRU)), a mobile node, or a mobile.

The transmitting apparatus may form B beam sectors for each array by using pattern/polarization antenna arrays each including pattern/polarization antenna elements having P different radiation patterns.

As illustrated in FIG. 5, the pattern/polarization antenna array (the pattern/polarization antenna array structure) shown in FIG. 3 may be divided into K virtual antenna arrays. A $k^{th}$ virtual antenna array may have a dimension of $M_k \times N_k$. Herein, $M_k$ and $N_k$ may be integer numbers that are smaller than M and N, respectively. As a simple case, K may be equal to P.

Each virtual antenna array may be used to divide a service area into B sectors each having an AoD independent (regardless) of the virtual antenna array index k. For example, a service area may be a region in which UE to be serviceable by (or to be able to communicate with) the transmitting apparatus is located.

Accordingly, by using the pattern/polarization antenna array having the K virtual antenna arrays, an $N_r \times K$ channel may be implemented in each sector. $N_r$ may represent the number of UE antennas. min ($N_r$, K) symbols may be transmitted to each sector through the same time/frequency resource.

In order for K signals to be transmitted to the beam sector b, K signals $\{s_1(b), s_2(b) \ldots s_K(b)\}$ to be transmitted to the beam sector b are precoded, and the precoder output signals $\{u_1(b), u_2(b), \ldots u_K(b)\}$ are beamformed by using weight vectors $w_k^{(b)} = w^{(b)} + e_k^{(b)}$ for the respective signals, and a beamformer output signal $\{x_k(b), k=1, 2, \ldots K\}$ is transmitted by using a respective pattern/polarization antenna array k (k=1, 2, . . . , and K).

$w_K^{(b)}$ may represent a beamformer weight (or a beamforming weight) for a $k^{th}$ signal (or $k^{th}$ stream) transmitted to the beam sector b. $W^{(b)}$ represents a beamformer weight (or a beamforming weight) for the beam sector b, defining the beam sector b with a direction of the center of the beam sector b.

$e_k^{(b)}$ represents a $N_T \times 1$ vector in which each element has a value equal to or approximately 0, and the $N_T$ represents the number of transmit antennas.

A precoder b serves to control interference between the K signals transmitted to the beam sector b.

In order to analyze characteristics of a P2BDMA channel, a signal model in a particular beam sector b is described as follows.

It is assumed that there are L paths (or L scatterers) leading from a transmitting apparatus (e.g. an eNB) to a UE device in the beam sector b. A signal vector received by UE having $N_r$ receive antennas is expressed by Equation 1.

$$y = Hs^{(b)} + n \quad \text{Equation 1:}$$

Here, $s^{(b)} = (s_1^{(b)} s_2^{(b)} \ldots s_K^{(b)})^T$ is a transmit symbol vector. n is an additive noise vector.

A channel matrix is expressed by Equation 2.

$$H = \sum_{l=1}^{L} \alpha_l (a_{TX}^T(l) W^{(b)}) A_{RX}(l) Q(l) \quad \text{Equation 2}$$

Here, $\alpha_l$ is gain and phase response of an $l^{th}$ path, $w_K^{(b)} = (w_1^{(b)} w_2^{(b)} \ldots w_{N_T}^{(b)})^T$ is a beamformer weight for the beam sector b, and $a_{TX}(l)$, $A_{RX}(l)$, $Q(l)$ are expressed by Equations 3, 4, and 5, respectively.

$$a_{TX}(l) = (a_1^{TX} a_2^{TX} \ldots a_{N_t}^{TX})^T \quad \text{Equation 3:}$$

$a_{TX}(l)$ may represent an array factor of a transmit antenna array with respect to an $l^{th}$ path. $a_n^{TX}$ may represent an element factor of an $n^{th}$ transmit antenna element.

$$A_{RX}(l) = \text{diag}(a_1^{RX} a_2^{RX} \ldots a_{N_t}^{RX}) \quad \text{Equation 4:}$$

$A_{RX}(l)$ may represent a diagonal matrix which has an array factor of a receive antenna array with respect to the $l^{th}$ path as an element. $a_n^{RX}$ may represent an element factor of an $n^{th}$ receive antenna element, and diag(.) may represent a diagonalization operation.

$$Q(l) = \begin{pmatrix} Q_{11}(l) & Q_{12}(l) & \ldots & Q_{1K}(l) \\ Q_{21}(l) & Q_{22}(l) & \ldots & Q_{2K}(l) \\ \ldots & & & \\ Q_{N_r 1}(l) & Q_{N_r 2}(l) & \ldots & Q_{N_r K}(l) \end{pmatrix} \quad \text{Equation 5}$$

$Q(l)$ may represent an $N_r \times K$ matrix that indicates a radiation pattern and a cross polarization effect (or interference polarization effect, cross-polarization effect). For example, $Q(l)$ may indicate an influence on an $l^{th}$ path channel by an antenna radiation pattern and polarization between a transmit antenna array and a receive antenna array. Herein, an $(m, n)^{th}$ element may be defined as Equation 6.

$$Q_{mk}(l) = \begin{pmatrix} B_m^v(\Omega_l^{RX}) \\ B_m^h(\Omega_l^{RX}) \end{pmatrix}^T \begin{pmatrix} \sigma_l^{vv} e^{j\psi_l^{vv}} & \sigma_l^{vh} e^{j\psi_l^{vh}} \\ \sigma_l^{hv} e^{j\psi_l^{hv}} & \sigma_l^{hh} e^{j\psi_l^{hh}} \end{pmatrix} \begin{pmatrix} B_k^v(\Omega_l^{TX}) \\ B_k^h(\Omega_l^{TX}) \end{pmatrix} \quad \text{Equation 6}$$

$B_m^v(\Omega_l^{RX})$ and $B_m^h(\Omega_l^{RX})$ may represent a vertical radiation pattern and a horizontal radiation pattern of an $m^{th}$ receive antenna having a AoA of $\Omega_l^{RX}$ corresponding to the $l^{th}$ path.

$B_k^v(\Omega_l^{TX})$ and $B_k^h(\Omega_l^{TX})$ may represent a vertical radiation pattern and a horizontal radiation pattern of a $k^{th}$ transmit antenna having a AoD of $\Omega_l^{TX}$ corresponding to the $l^{th}$ path.

$$\begin{pmatrix} \sigma_l^{vv} e^{j\psi_l^{vv}} & \sigma_l^{vh} e^{j\psi_l^{vh}} \\ \sigma_l^{hv} e^{j\psi_l^{hv}} & \sigma_l^{hh} e^{j\psi_l^{hh}} \end{pmatrix}$$

may represent a cross polarization effect of the $l^{th}$ path. Based on the above-derived signal model, a rank of a MIMO channel in the beam sector b is analyzed as follows.

When transmit pattern/polarization antenna arrays of the transmitting apparatus are different from each other, and all receive antennas (or all receive antenna elements) of the UE are the same, all rows of Q(l) may be the same. Accordingly, Equation 2 may be expressed as Equation 7.

$$H = \sum_{l=1}^{L} \alpha (a_{TX}^T(l) w) a_{RX}(l) q_1^R(l) \quad \text{Equation 7}$$

Here, $q_1^R(l)$ is a first row vector of Q(l), and $a_{RX}(l)$ representing an array factor of a receive antenna array with respect to the $l^{th}$ path may be expressed by Equation 8.

$$a_{RX}(l) = (a_1^{RX} a_2^{RX} \ldots a_{N_r}^{RX})^T \quad \text{Equation 8:}$$

Here, since the matrix H in Equation 7 is a linear combination of a rank matrix $\{a_{RX}(l) q_1^R(L), l=1, 2, \ldots L\}$, a maximum value of the rank H is not larger than L. Accordingly, the channel matrix H has a rank of min (L, $N_r$, K), and for L≥min ($N_r$,K), the rank is min($N_r$, K).

When transmit pattern/polarization antenna arrays of the transmitting apparatus have different patterns, and all receive antennas of the UE also have different patterns, the matrix Q(l) may include a rank min ($N_r$,K), meaning that regardless of a value of L, the rank of the channel H is min($N_r$,K). In this case, min($N_r$,K)>1, and even in a line-of-sight channel of L=1, the rank of H is larger than 1.

In a scattering environment of L≥min($N_r$,K), regardless of whether UE antenna elements have the same radiation patterns or different radiation patterns, the rank of the channel H may be increased to min($N_r$,K) by increasing the number of types of pattern/polarization antennas. In the case of UE antenna elements having different antenna patterns, multiple symbols may be transmitted at the same time and same frequency through the channel H having L=1 by increasing $N_r$ and K.

Hereinafter, a rank characteristic of the channel H according to the antenna array of the transmitting apparatus and the UE antenna pattern described above, that is, a simulation of DoF is described with reference to FIGS. 6 and 7.

Figure 6:
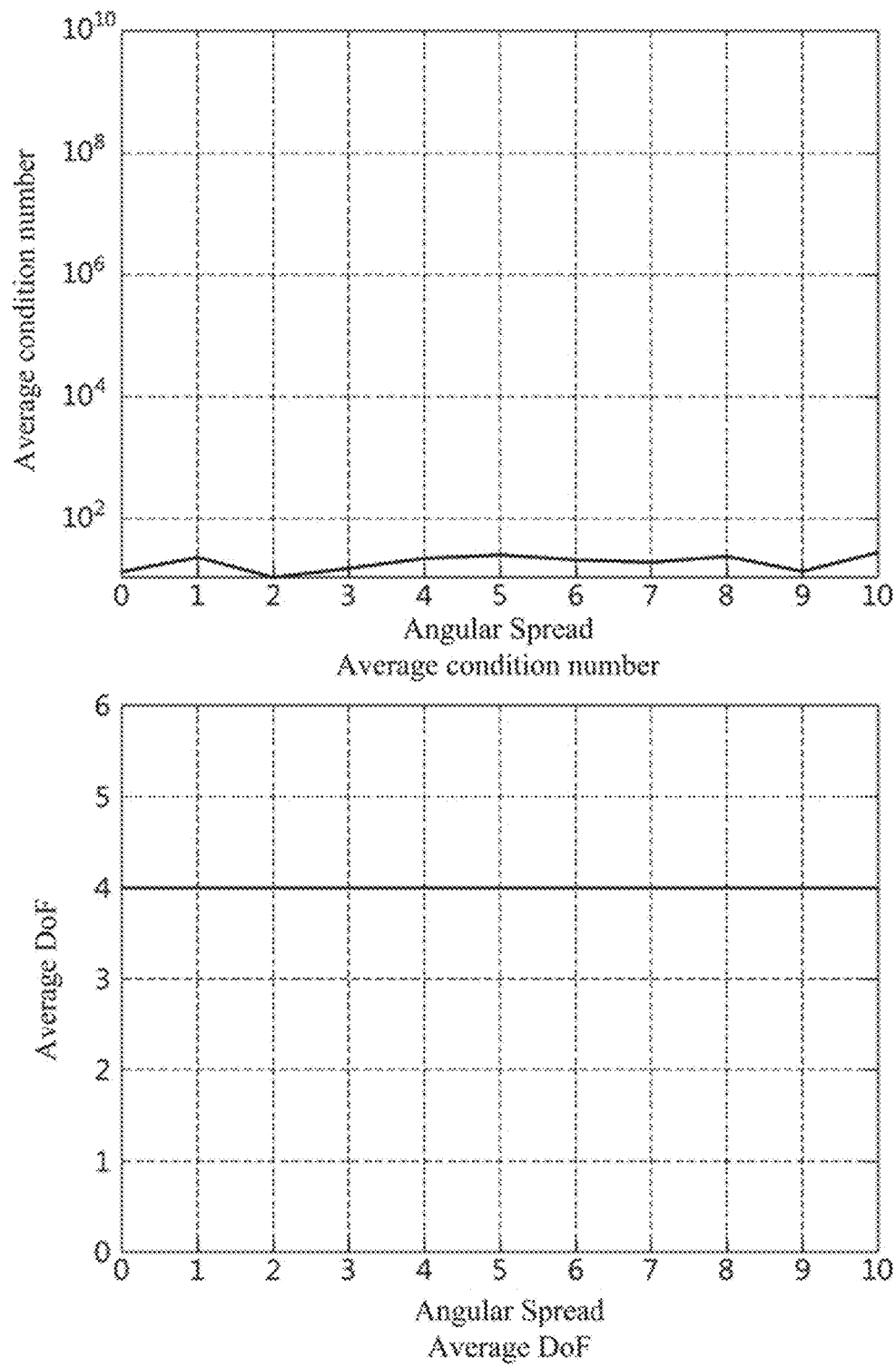
FIG. 6 illustrates a channel simulation that uses uniform linear arrays when receive antennas have patterns different from each other.

FIG. 6 illustrates a channel simulation that uses uniform linear arrays when receive antennas have patterns different from each other.

When transmit pattern/polarization antenna arrays have different patterns, and receive antennas also have different patterns, the rank characteristic of the channel H may be the same as shown in FIG. 6. In this case, the simulation is performed under a condition in which the number of channel clusters in each beam sector is Ncl=1, the number of rays in each channel cluster is Nray=20, the number of transmit antenna elements of a transmit antenna array is Nt=16, and the number of receive antenna elements of a receive antenna array is Nr=4, and K=4.

The simulation result shows that DoF=4 is obtained regardless of an angular spread. Also, in determining DoF, a subspace eigenvector in which a channel matrix singular value is equal to or lower than $1/10^3$ of the maximum value is determined to be a null subspace.

Figure 7:
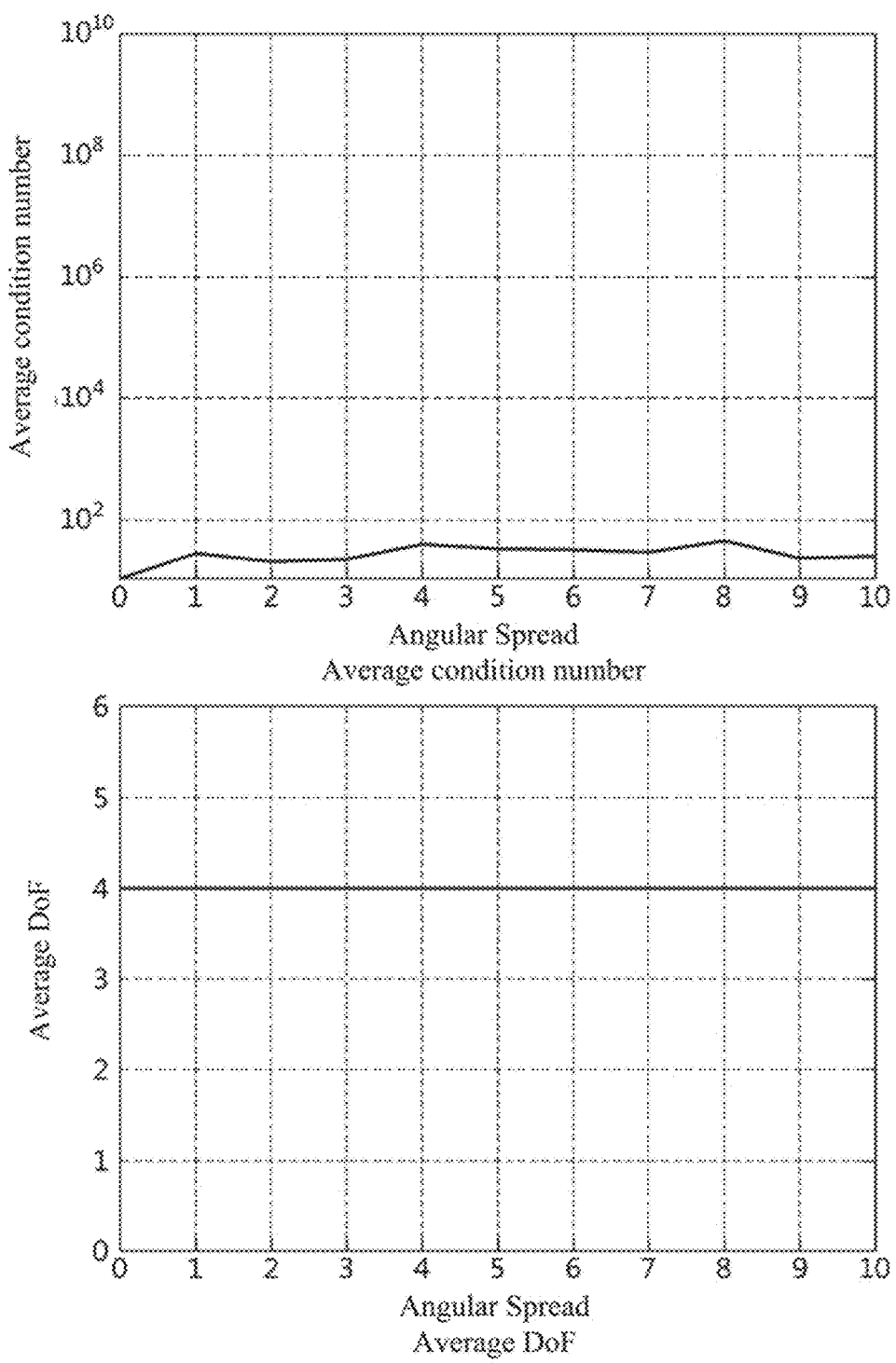
FIG. 7 illustrates a channel simulation that uses uniform linear arrays when receive antennas have patterns identical to each other.

FIG. 7 illustrates a channel simulation that uses uniform linear arrays when receive antennas have patterns identical to each other.

When transmit pattern/polarization antenna arrays have different patterns, and receive antennas have the same patterns, the rank characteristic of the channel H may be the same as shown in FIG. 7. In this case, the simulation is performed under a condition in which the number of channel clusters in each beam sector is Ncl=1, the number of rays in each channel cluster is Nray=20, the number of transmit antenna elements in a transmit antenna array is Nt=16, and the number of receive antenna elements of a receive antenna array is Nr=4, and K=4.

Similar to FIG. 6, the simulation result in FIG. 7 also shows that DoF=4 is obtained regardless of an angular spread. Also, in determining DoF, a subspace eigenvector in which a channel matrix singular value is equal to or lower than $1/10^3$ of the maximum value is determined to be a null subspace.

Figure 8:
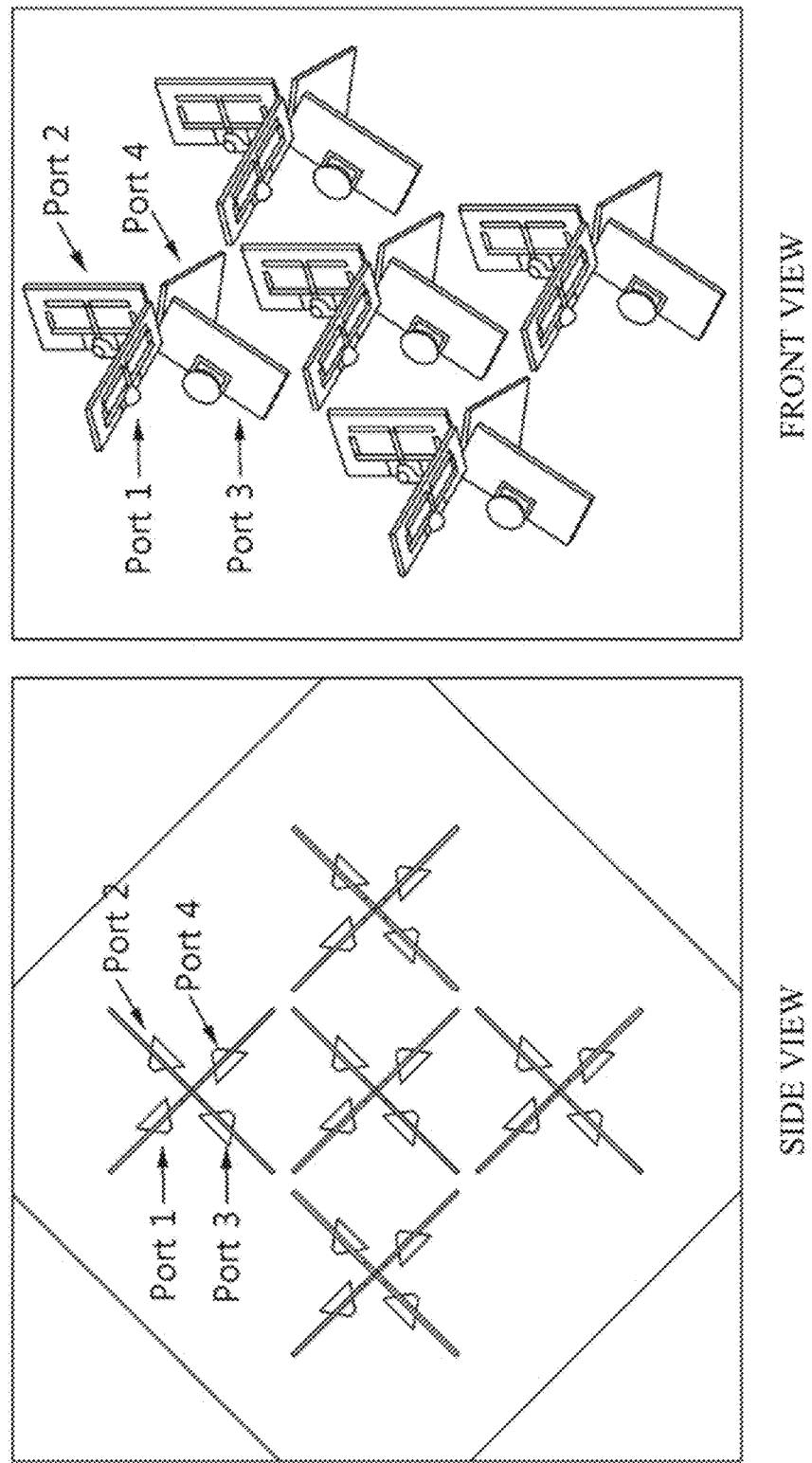
FIG. 8 illustrates an example of implementing a pattern polarization antenna structure according to an embodiment.
Figure 9:
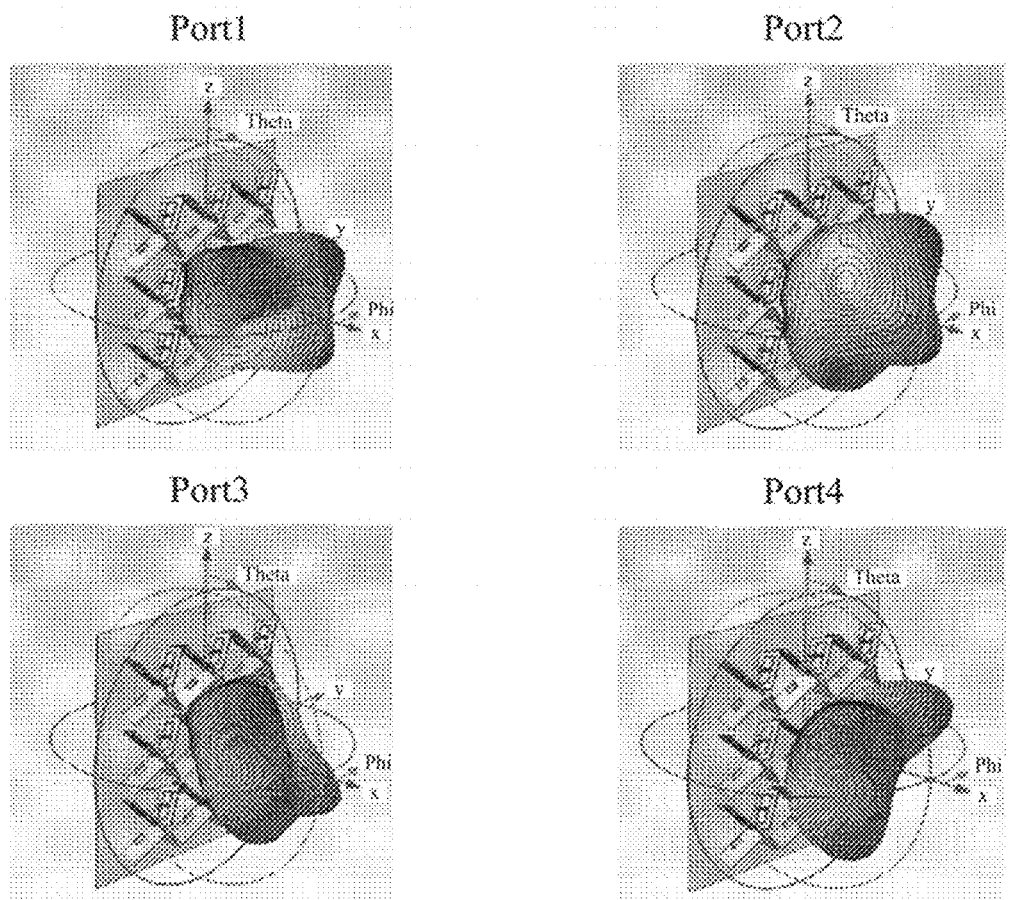
FIG. 9 illustrates port-specific radiation patterns of pattern polarization antenna elements shown in FIG. 8.

FIG. 8 illustrates an example of implementing a pattern polarization antenna structure according to an embodiment, and FIG. 9 illustrates port-specific radiation patterns of pattern polarization antenna elements shown in FIG. 8.

Referring to FIG. 8, in order to observe the performance of the P2BDMA technology according to an embodiment from a further practical point of view, pattern polarization antennas having four pattern/polarization characteristics are designed. Radiation patterns of the pattern polarization antenna elements according to ports of the pattern polarization antenna elements are illustrated in FIG. 9.

Hereinafter, the result of the P2BDMA performance simulation is described.

Figure 10:
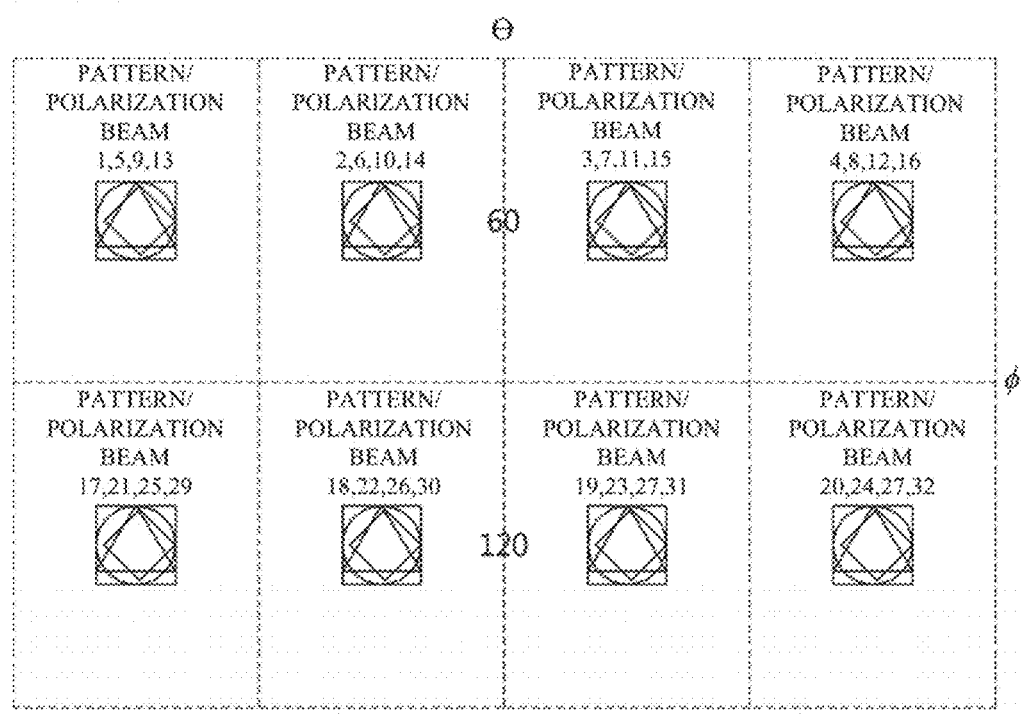
FIG. 10 illustrates a configuration of polarization BDMA beam sectors for a P2BDMA performance simulation.
Figure 11:
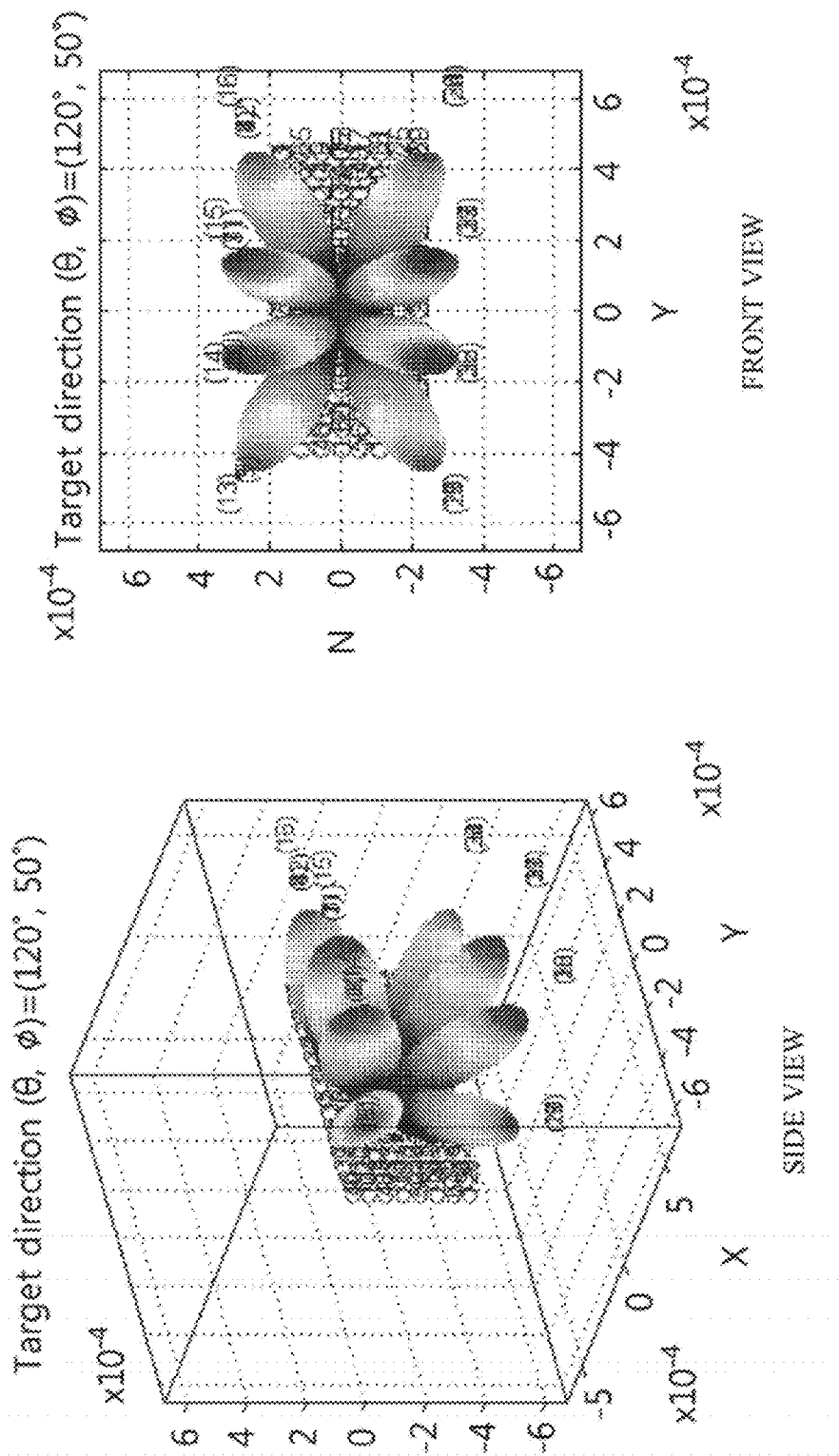
FIG. 11 illustrates beam patterns that are generated by reflecting AoDs of the beam sectors shown in FIG. 10.

FIG. 10 illustrates a configuration of polarization BDMA beam sectors for a P2BDMA performance simulation, and FIG. 11 illustrates beam patterns that are generated by reflecting AoDs of the beam sectors shown in FIG. 10.

As illustrated in FIG. 10, AoDs of eight beam sectors are defined for the P2BDMA performance simulation. Four pattern polarization beams may be transmitted in each beam sector, with a total of thirty two pattern polarization beams transmitted in the beam sectors. FIG. 11 illustrates beam patterns obtained by applying an optimization scheme to the thirty two pattern polarization beams reflecting the AoDs of the beam sectors shown in FIG. 10.

Figure 12:
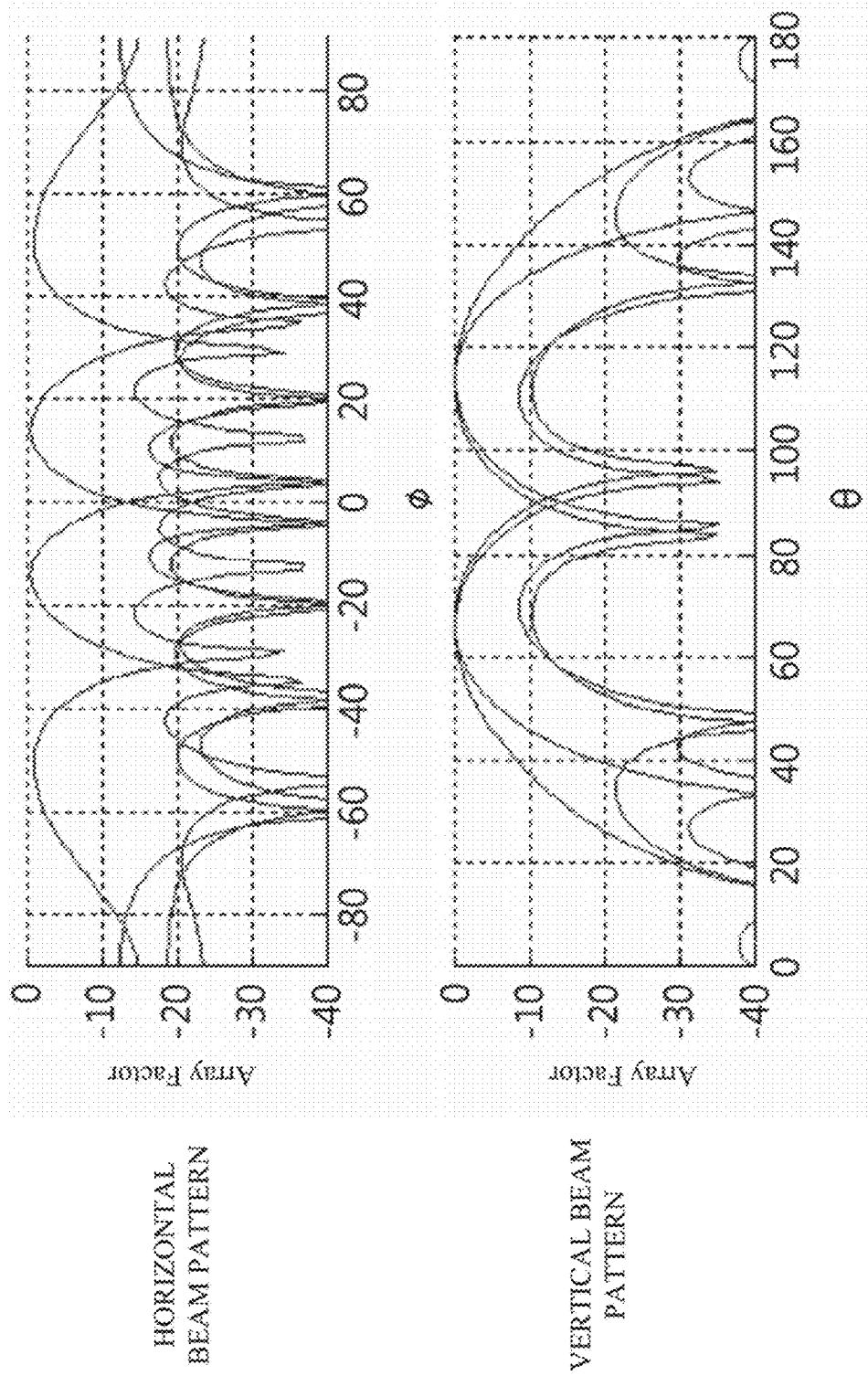
FIG. 12 illustrates patterns of horizontal beams that are designed by using eight horizontal antenna elements and patterns of vertical beams that are designed by using four vertical antenna elements.

FIG. 12 illustrates patterns of horizontal beams that are designed by using eight horizontal antenna elements and patterns of vertical beams that are designed by using four vertical antenna elements.

As illustrated in FIG. 12, the horizontal beam has a side lobe level of about −18 dB, and the vertical beam has a side lobe level of about −10 dB.

Figure 13:
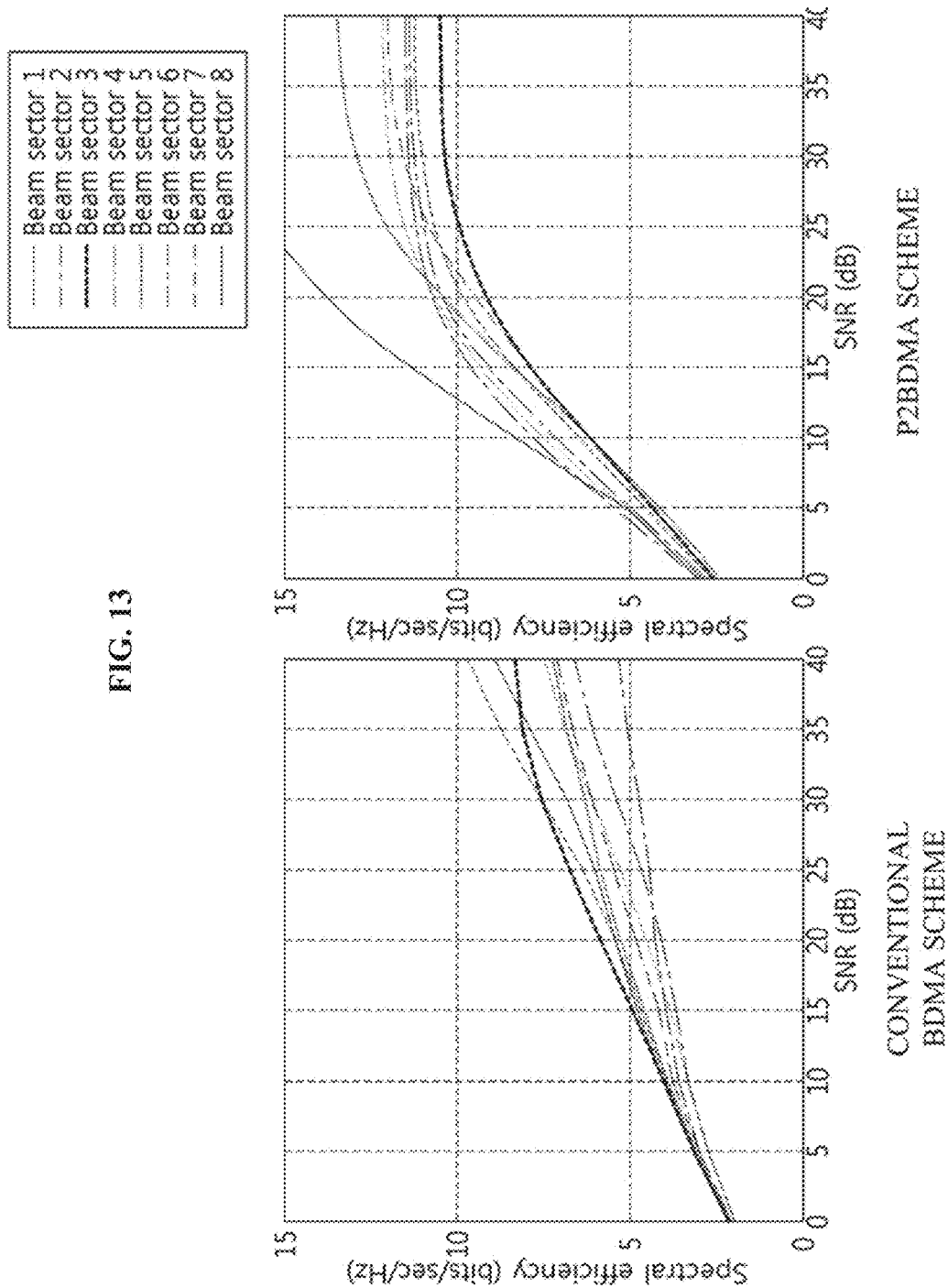
FIG. 13 illustrates an example of comparing spectral efficiency between the conventional BDMA and P2BDMA.

FIG. 13 illustrates an example of comparing the spectral efficiency between the conventional BDMA and P2BDMA.

Referring to FIG. 13, the simulation has been performed under conditions in which channels of horizontal and vertical spaces each have an angular spread of 5 degrees, and the number of rays in a single cluster is 20. In each case where beam sectors are subjected to the conventional BDMA scheme and are subjected to the P2BDMA scheme according to an embodiment, the SNR-to-spectral efficiencies of the respective beam sectors are illustrated as in FIG. 13.

Figure 14:
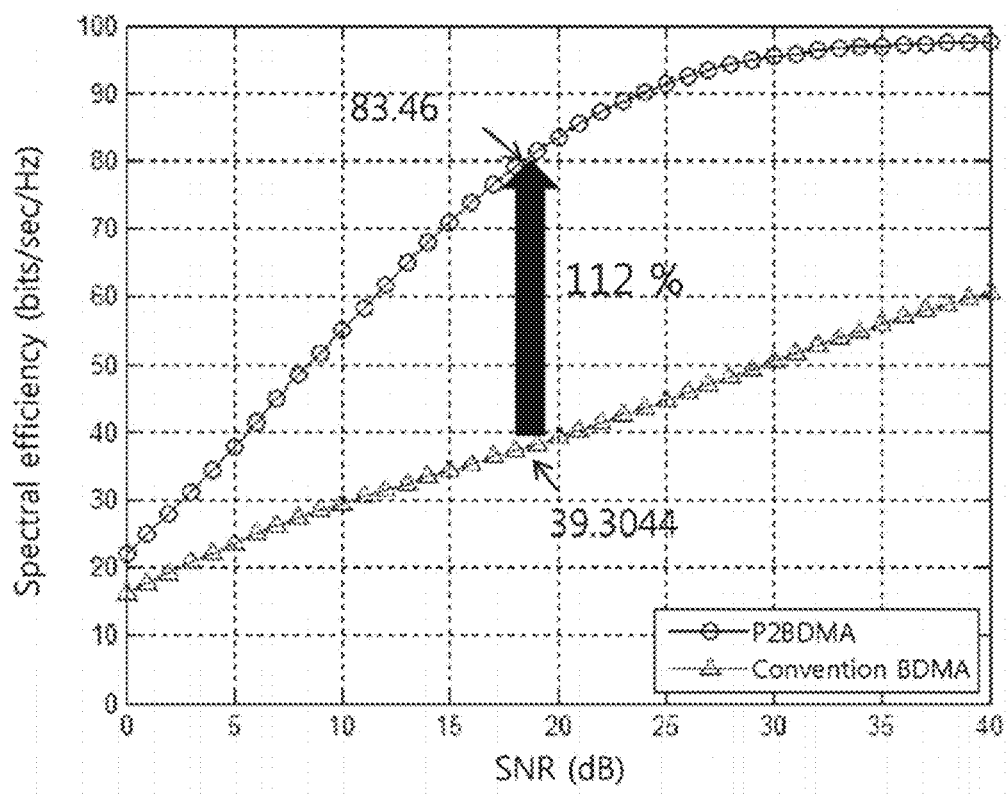
FIG. 14 illustrates another example of comparing spectral efficiency between the conventional BDMA and P2BDMA.

FIG. 14 illustrates another example of comparing the spectral efficiency between the conventional BDMA and P2BDMA.

FIG. 14 shows the summations of SNR versus spectral efficiencies obtained in eight beam sectors in each case where the conventional BDMA scheme and the P2BDMA scheme according to the embodiment are applied to the eight beam sectors. Referring to FIG. 14, it can be seen that at a SNR=20 dB, the P2BDMA technology has a spectral efficiency increased by 112% over the conventional BDMA technology.

Under various simulation conditions, including the above-described conditions, the P2BDMA technology has performance improvement over the conventional BDMA technology as shown in Table 1.

TABLE 1

| Condition | | Performance improve member | SE at |
|---|---|---|---|
| Angular spread | # of rays | at SNR = 20 dB | high SNR |
| 10° | 20 | 22.17 -> 41.75 bps/Hz (88%) | 45 bps/Hz |
| 5° | 20 | 39.3 -> 83.46 bps/Hz (72%) | 98 bps/Hz |
| 1° | 20 | 30.52 -> 71.66 bps/Hz (135%) | 98 bps/Hz |
| 1° | 1 | 28.4 -> 50.02 bps/Hz (90%) | 58 bps/Hz |

According to Table 1, the following characteristics are observed.

1. A result of simulating the polarization antenna illustrated in FIG. 8 shows a system capacity improvement of 90% to 112% or more compared to the conventional BDMA.

2. A failure to increase spectral efficiency (SE) to three times larger than that of the BDMA seems attributed to the side lobe of the beam.

3. The maximum SE obtained at a high SNR is 98 bps/Hz

4. As the number of the rays increases, the SE becomes larger.

5. At an angular spread of 5 degrees, the largest SE is obtained. It is analyzed that at an angular spread of 10 degrees, the SE is decreased due to beam sector interference, and at an angular spread of 1 degrees, correlation between ray channels is increased.

A result of performance analysis through simulation shows that the P2BDMA technology according to the embodiment obtains system capacity improvement of 90% to 112% or more compared to the conventional BDMA.

In other words, the P2BDMA technology according to the embodiment can achieve improvement of spectral efficiency with reference to the same space available for an antenna, at the expense of slightly increasing the complication of implementation per the same antenna space (with integration of four pattern/polarization antennas).

The devices and components described in the embodiments may be implemented using hardware, software components, or a combination thereof. For example, the devices and components may be implemented using one or more general-purpose or special purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may include an operating system (OS) and one or more software applications that run on the operating system. The processing device also may access, store, manipulate, process, and create data in response to execution of the software. For purpose of simplicity, one processing device is described as being used; however, one skilled in the art will appreciate that a processing device may include multiple processing elements and/or multiple types of processing elements. For example, the processing device may include a plurality of processors or one processor and one controller. In addition, different processing configurations are possible, such as parallel processors.

The software may include a computer program, code, instructions, or a combination of one or more thereof, for configuring the processing device to operate as desired, or for independently or collectively instructing the processing device. Software and/or data may be embodied permanently or temporarily in any type of machine, component, physical or virtual equipment, computer storage medium or device, or in a propagated signal wave so as to be interpreted by the processing device or capable of providing instructions or data to the processing device. The software also may be distributed over network-coupled computer systems so that the software is stored and executed in a distributed fashion. In particular, the software and data may be stored by one or more computer readable recording mediums.

The method according to an embodiment may be implemented in the form of program instructions that may be executed by various computer means and recorded on a computer readable medium. The computer readable medium may include alone or in combination with program instructions, data files, data structures, and the like. The program instructions recorded on the medium may be those specially designed and constructed for the purposes, or they may be of the type well-known and available to those having skill in the computer software arts. Examples of the computer readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and high-level language code executable by a computer through an interpreter. The above-described hardware devices may be configured to act as one or more software modules in order to perform the operations of the above-described embodiments, or vice versa.

Although an exemplary embodiment of the present invention has been described for illustrative purposes, those skilled in the art will appreciate that various modifications, changes and substitutions are possible, without departing from the scope and spirit of the invention. For example, it will be understood that suitable results may be achieved if the described techniques are performed in a different order and/or if components of the above-described system, structure, device, and circuit are coupled or combined in a different manner and/or replaced or supplemented by other components or there equivalents.

Accordingly, other implementations, other embodiments, and equivalent to the claims are within the scope of the following claims.

What is claimed is:

1. A method for pattern/polarization beam division multiple access, the method comprising:
generating a plurality of beam sectors for each antenna array by using a plurality of pattern/polarization antenna arrays; and
performing multiple input multiple output (MIMO) transmission in each of the plurality of beam sectors,
wherein the plurality of pattern/polarization antenna arrays each has a different radiation pattern in a beam sector of the plurality of beam sectors, and
wherein angles of departure of beams in each of the plurality of beam sectors are the same regardless of antenna array indexes of the plurality of pattern/polarization antenna arrays.

2. The pattern/polarization beam division multiple access method of claim 1, wherein the performing MIMO transmission comprises:
precoding signals, that are transmitted to each beam sector of the plurality of beam sectors, to form precoded signals;
performing beamforming on the precoded signals on the basis of a weight for each of the precoded signals to form beamformed signals; and
transmitting the beamformed signals by using each of the plurality of pattern/polarization antenna arrays.

3. The pattern/polarization beam division multiple access method of claim 1, wherein the plurality of antenna arrays are implemented in an overlapping structure.

4. A communication apparatus comprising:
a plurality of pattern/polarization antenna arrays each having a different radiation pattern; and
a controller configured
to generate a plurality of beam sectors for each antenna array by using the plurality of pattern/polarization antenna arrays and
to perform MIMO transmission in each bean sector of the plurality of beam sectors,
wherein different pattern/polarization antenna arrays from the plurality of pattern/polarization antenna arrays have different radiation patterns in corresponding beam sectors from the plurality of beam sectors, and
wherein angles of departure of beams in beam sectors of the plurality of beam sectors are the same regardless of antenna array indexes of the plurality of pattern/polarization antenna arrays.

5. The communication apparatus of claim 4, wherein the controller includes:
a precoder configured to precode signals that are transmitted to each beam sector of the plurality of beam sectors; and
a beamformer configured to perform beamforming on the precoded signals on the basis of a weight for each of the precoded signals.

6. The communication apparatus of claim 5, wherein the weight is determined on the basis of Equation below:

$$W_K^{(b)} = W^{(b)} + e_k^{(b)} \qquad \text{(Equation)}$$

wherein $W_K^{(b)}$ represents a weight for a $k^{th}$ precoded signal, and $W^{(b)}$ represents a weight for a beam sector to which the $k^{th}$ precoded signal is transmitted, and $e_k^{(b)}$ represents a vector $N_T \times 1$ in which each element has a value of 0, and the $N_T$ represents the number of antenna elements.

7. The communication apparatus of claim 5, wherein the precoder is implemented for each beam sector of the plurality of beam sectors.

8. The communication apparatus of claim 4, wherein the plurality of antenna arrays are implemented in an overlapping structure.

9. A method for pattern/polarization beam division multiple access, the method comprising:
   generating a plurality of beam sectors for each antenna array by using a plurality of pattern/polarization antenna arrays; and
   performing multiple input multiple output (MIMO) transmission in each of the plurality of beam sectors, wherein the performing includes:
      precoding signals, that are transmitted to each beam sector of the plurality of beam sectors, to form precoded signals;
      performing beamforming on the precoded signals on the basis of a weight for each of the precoded signals to form beamformed signals; and
      transmitting the beamformed signals by using each of the plurality of pattern/polarization antenna arrays;
   wherein the plurality of pattern/polarization antenna arrays each has a different radiation pattern in a beam sector of the plurality of beam sectors, and
   wherein angles of departure of beams in each of the plurality of beam sectors are same regardless of antenna array indexes of the plurality of pattern/polarization antenna arrays, and
   wherein the weight is determined on the basis of the following Equation:

$$W_K^{(b)} = W^{(b)} + e_k^{(b)} \quad \text{(Equation)}$$

wherein $W_K^{(b)}$ represents a weight for a kth precoded signal, and $W^{(b)}$ represents a weight for a beam sector to which the kth precoded signal is transmitted, and (b) $e_k^{(b)}$ represents a vector $N_T \times 1$ in which each element has a value of 0, and the $N_T$ represents the number of antenna elements.

10. A communication apparatus comprising:
   a plurality of pattern/polarization antenna arrays each having a different radiation pattern; and
   a controller including a) a precoder configured to precode signals that are transmitted to each beam sector of the plurality of beam sectors; and b) a beamformer configured to perform beamforming on the precoded signals on the basis of a weight for each of the precoded signals, wherein the weight is determined on the basis of the following Equation:

$$W_K^{(b)} = W^{(b)} + e_k^{(b)} \quad \text{(Equation)}$$

wherein $W_K^{(b)}$ represents a weight for a $k^{th}$ precoded signal, and $W^{(b)}$ represents a weight for a beam sector to which the $k^{th}$ precoded signal is transmitted, and
   $e_k^{(b)}$ represents a vector $N_T \times 1$ in which each element has a value of 0, and the $N_T$ represents the number of antenna elements;
   wherein the controller is configured
      to generate a plurality of beam sectors for each antenna array by using the plurality of pattern/polarization antenna arrays and
      to perform MIMO transmission in each bean sector of the plurality of beam sectors,
   and
   wherein angles of departure of beams in beam sectors of the plurality of beam sectors are the same regardless of antenna array indexes of the plurality of pattern/polarization antenna arrays.

* * * * *